United States Patent [19]

Dolland

[11] Patent Number: 5,323,303
[45] Date of Patent: Jun. 21, 1994

[54] ACTIVE DAMPER FOR EMI FILTER

[75] Inventor: Carlisle R. Dolland, Torrance, Calif.

[73] Assignee: AlliedSignal Inc., Morris Township, Morris County, N.J.

[21] Appl. No.: 847,146

[22] Filed: Mar. 5, 1992

[51] Int. Cl.$^5$ .................................................. H02J 1/02
[52] U.S. Cl. .......................................... 363/39; 363/47; 333/181
[58] Field of Search ............... 323/205, 206, 207, 208, 323/209, 210, 211; 363/47, 48, 39, 46, 45; 333/181, 17.1, 17.2, 12; 307/105

[56] References Cited

U.S. PATENT DOCUMENTS

| | | | |
|---|---|---|---|
| 3,955,134 | 5/1976 | Woodford | 323/61 |
| 4,156,176 | 5/1979 | Gyugyi et al. | 323/106 |
| 4,188,573 | 2/1980 | Gyugi et al. | 323/4,352,573 |
| 4,254,458 | 3/1981 | Griffith | 363/13 |
| 4,275,436 | 6/1981 | Peterson | 363/47 |
| 4,352,137 | 9/1982 | Johns | 361/82 |
| 4,353,024 | 10/1982 | Gyugyi | 323/211 |
| 4,363,974 | 12/1982 | Beckwith | 307/40 |
| 4,449,177 | 5/1984 | Kozai et al. | 363/126 |
| 4,636,708 | 1/1987 | Whyte | 323/210 |
| 4,638,238 | 1/1987 | Gyugi et al. | 323/211 |
| 4,686,630 | 8/1987 | Marsland et al. | 364/492 |
| 4,755,738 | 7/1988 | Shimamura et al. | 323/210 |
| 4,771,225 | 9/1988 | Nishikawa | 323/211 |
| 4,811,236 | 3/1989 | Brennen et al. | 364/483 |
| 4,933,826 | 6/1990 | Person | 363/47 |
| 4,937,719 | 6/1990 | Yamada et al. | 363/39 |
| 5,016,157 | 5/1991 | Rozman et al. | 363/39 |
| 5,099,190 | 3/1992 | Sato | 323/210 |

Primary Examiner—Steven L. Stephan
Assistant Examiner—Ben Davidson
Attorney, Agent, or Firm—Robert A. Walsh

[57] ABSTRACT

An active damper for an L-C filter suppresses transients that appear on the DC link from a power supply. The damper suppresses the transients by filtering the line voltage to obtain its steady-state component and comparing the steady-state voltage to the instantaneous voltage on the DC link. When the two voltages differ, the active damper cancels the transient by dissipating the energy on the DC link and the energy stored in the filter's inductor.

14 Claims, 2 Drawing Sheets

ACTIVE DAMPER FOR EMI FILTER

The invention described herein was made in the performance of work under Contract No. NAS-8-50000, and is subject to the provisions of Section 305 of the National Aeronautics and Space Act of 1958 (42 U.S.C. 2457).

BACKGROUND OF THE INVENTION

This invention relates in general to power supplies and in particular to a damping system for EMI filters.

All electromechanical equipment create electromagnetic interference or "noise" on their power lines. The noise can be generated by load transients, switching power supplies or PWM inverters. Such noise can adversely affect the performance of other equipment that receive power from same power lines.

Typically, the noise is removed from the power lines by an EMI filter. As shown in FIG. 1, the EMI filter 2 includes an inductor L and capacitor C coupled between an input voltage bus 4a, 4b and a DC link 6a, 6b. This filter has a resonant frequency of $1/(2\pi\sqrt{LC})$. The EMI filter 2 passes all signals having frequencies above the resonant frequency and attenuates all signals having frequencies below the resonant frequency. However, it amplifies signals having frequencies at or near the resonant frequency. As a result, the peak voltage at the resonant frequency exceeds the voltage on the bus 4a, 4b. For an undamped EMI filter 2 having an inductance of 1 mH and a capacitance of 22 microfarads, the peak at the resonant frequency of 1 kHz is 18dB, which is 180% of the DC link voltage (see FIG. 2). Consequently, the ratings of the components, including the filter capacitor C, on the DC link 6a,6b must be increased above the maximum peak voltage.

The EMI filter 2 can be equipped with a damping circuit which limits peak voltage and ringing caused by load and line transients. Typically, this damping circuit includes a resistor in series with a capacitor. The damping resistor dissipates the energy stored in the filter 2 and the damping capacitor blocks the DC component of the input voltage, thereby reducing dissipation by the damping resistor. The size of the damping capacitor depends upon the maximum tolerable peak voltage. A maximum overshoot of 5-6 dB requires the damping capacitor to have a capacitance of approximately three times the filter capacitance. Further reduction in peaking requires an even larger damping capacitance, typically provided by a multilayer ceramic (MLC) capacitor.

The damping capacitor tends to be heavy and expensive. Further, MLC capacitors are only offered in discrete voltages (e.g., 100 vdc, 200 vdc, 400 vdc). Consequently, a power line voltage of 110 vdc requires an MLC capacitor of 200 vdc. Still further, link voltage peaking caused by moderate damping can force the use of bigger capacitors connected to the DC link.

The cost, size and weight of the capacitance increases with the power rating of the power supply system.

SUMMARY OF THE INVENTION

The foregoing disadvantages are overcome by an active damper for an LC filter having at least one inductor and at least one capacitor coupled between a power supply and a DC link. The active damper comprises determining means for determining a steady-state voltage on the DC link; comparing means, responsive to the determining means, for comparing the steady state voltage to an instantaneous voltage on the DC link; and dissipating means, responsive to the comparing means, for dissipating energy on the DC link when the instantaneous voltage on the DC link does not equal the steady state voltage.

DETAILED DESCRIPTION OF THE PREFERRED EMBODIMENT

Figure 1:
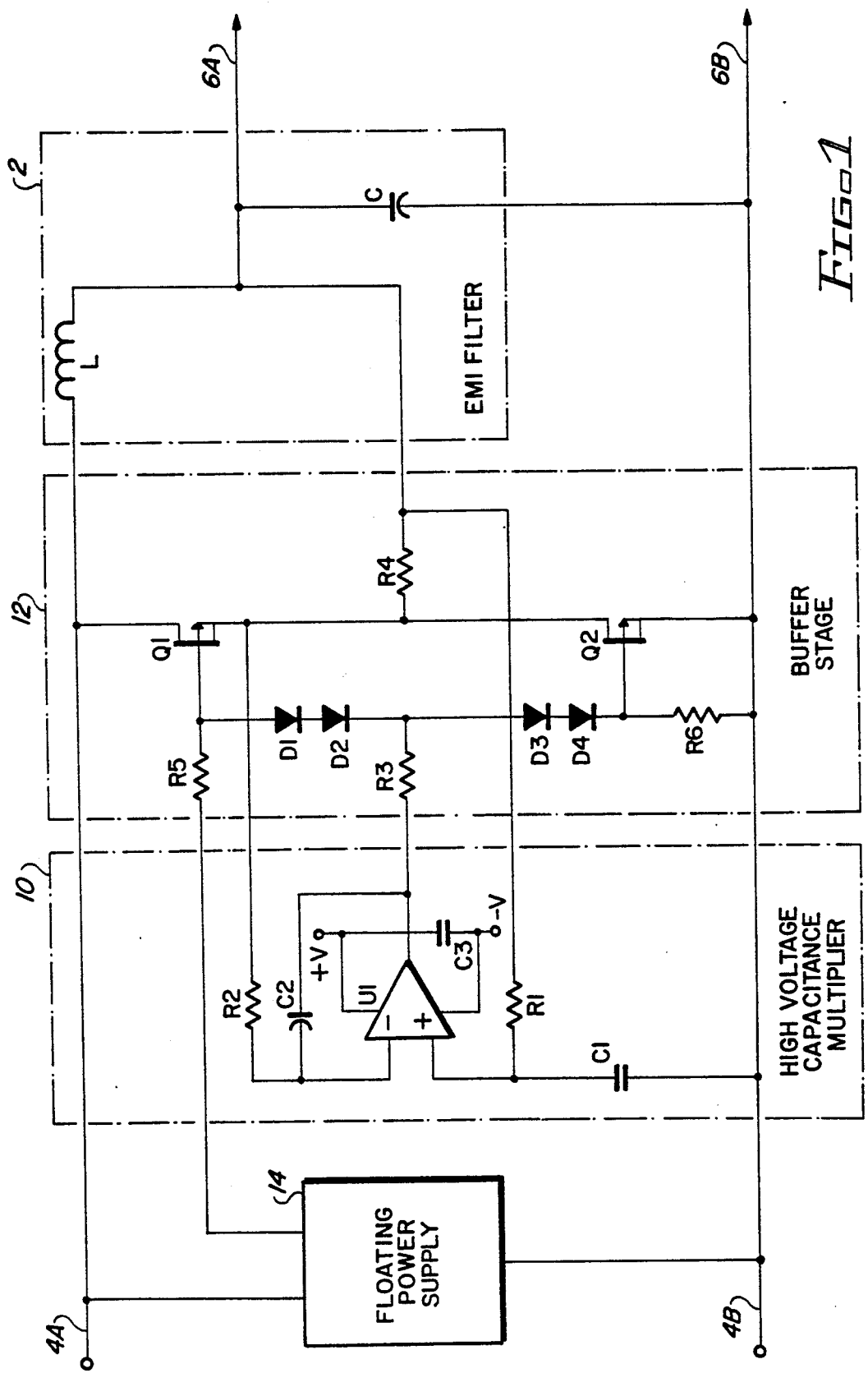
FIG. 1 is a schematic diagram of an EMI filter and an active damper according to the present invention.
Figure 2:
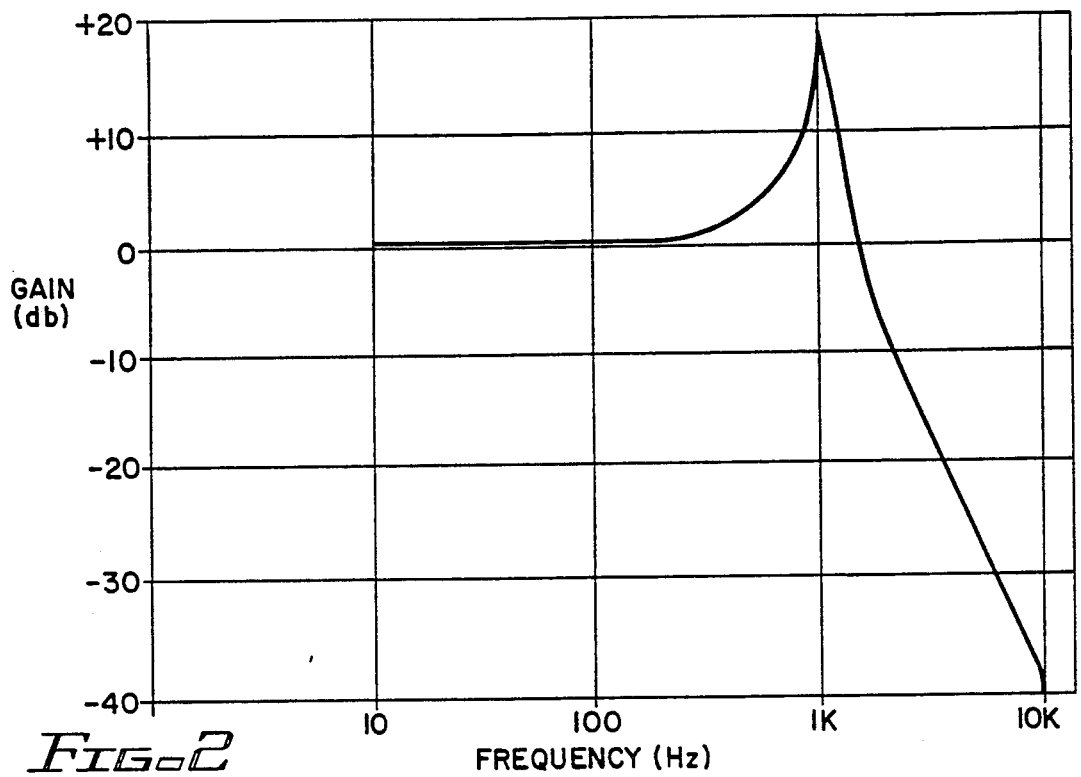
FIG. 2 shows the frequency response of the undamped EMI filter.

Referring once again to FIG. 1, the active damper includes a capacitance multiplier 10, buffer stage 12 and floating power supply 14. The capacitance multiplier 10 provides an error signal indicating the occurrence of a transient on the DC link 6a. Through a first resistor R1, a first capacitor C1 is charged to the potential of the DC link 6a. The voltage stored by the first capacitor C1 is applied to the non-inverting input of an operational amplifier U1. The instantaneous potential on the DC link 6a is supplied to the inverting input of the operational amplifier U1 via a second resistor R2. The operational amplifier U1 compares the voltage on the DC link 6a to the voltage stored by the first capacitor C1. Under steady state conditions, the two voltages are the same; therefore, the operational amplifier U1 produces an output voltage that inhibits operation of the buffer stage 12.

When a transient occurs on the DC link 6a, the voltage at the non-inverting input of the operational amplifier U1 does not change immediately since it is constrained by the first capacitor C1. However, the instantaneous voltage at the inverting input of the operational amplifier U1 follows the transient. The difference in voltages causes the operational amplifier U1 to generate the error signal.

The error signal is applied to the buffer stage 12, which dissipates the transient energy. The buffer stage 12 includes an N-channel FET Q1 and a P-channel FET Q2 whose sources are constrained at the potentials of the DC link 6a and whose drains are connected to the DC link 6a and 6b, respectively. The error signal from the capacitance multiplier 10 is applied to the gates of the FETS Q1 and Q2 through a third resistor R3. This resistor R3, along with a second capacitor C2, forms a compensation network to stabilize the operational amplifier U1.

When the error signal is low, indicating that a transient is on the rise, the P-channel FET Q2 is turned on and the N-channel FET Q1 is turned off, allowing the transient energy to flow through a path formed by the filter inductor L, the FET Q2 and a fourth resistor R4. The P-channel FET Q2 dissipates the transient energy from the DC link 6a. Thus, the FET Q2 is turned on to reduce the peak voltage.

The error signal goes high when the voltage on the filter capacitor C goes below the steady state voltage, i.e., when the filter capacitor C has dumped its energy into the filter inductor L. When the error signal is high, the N-channel FET Q1 is turned on and dissipates the bulk of the energy stored in the filter inductor L before that energy is dumped back into the filter capacitor C.

In this manner, the FET Q1 inhibits the filter 2 from ringing.

The fourth resistor R4 establishes the equivalent series resistance of the filter capacitor C, reducing the dissipation of the FETS Q1 and Q2.

While the buffer stage 12 is dissipating the transient energy stored in the EMI filter 2, the first capacitor C1 maintains its stored charge, i.e., the voltage on the DC link 6a before the transient occurred. Transient energy in the filter inductor L and capacitor C is dissipated until the instantaneous voltage on the DC link 6a equals the voltage stored in the first capacitor C1. The first resistor R1 and first capacitor C1 determine the time constant of the active damper and, consequently, the power dissipated by the buffer stage 12 during line transients. As a result, the time constant should be restricted to a maximum of five times the constant of the filter 2.

The FETS Q1 and Q2 must be forward biased so they can conduct. The gates of the FETS Q1 and Q2 are supplied with a voltage that is five to fifteen volts greater than the voltage on the DC link 6a. This voltage is supplied by the floating voltage supply 14. The floating voltage supply 14 can be generated by several well known means, such as a charge pump or a floating supply referenced to the DC link 6a. The charge pump is preferred because of its simplicity and its ability to operate off-line before the system power supply is operational. As a result, the damper becomes effective at power-up.

The operational amplifier U1 must operate at a high voltage. The capacitance multiplier 10 can employ either a a high voltage amplifier or a low voltage amplifier configured to operate at high voltages. Circuitry to implement the latter is well known to those skilled in the art.

Resistors R5 and R6 and diodes D1, D2, D3 and D4 function to bias the FETS Q1 and Q2 in order to improve the transient response of the active damper. A third capacitor C3 provides decoupling for the operational amplifier U1.

Figure 3:
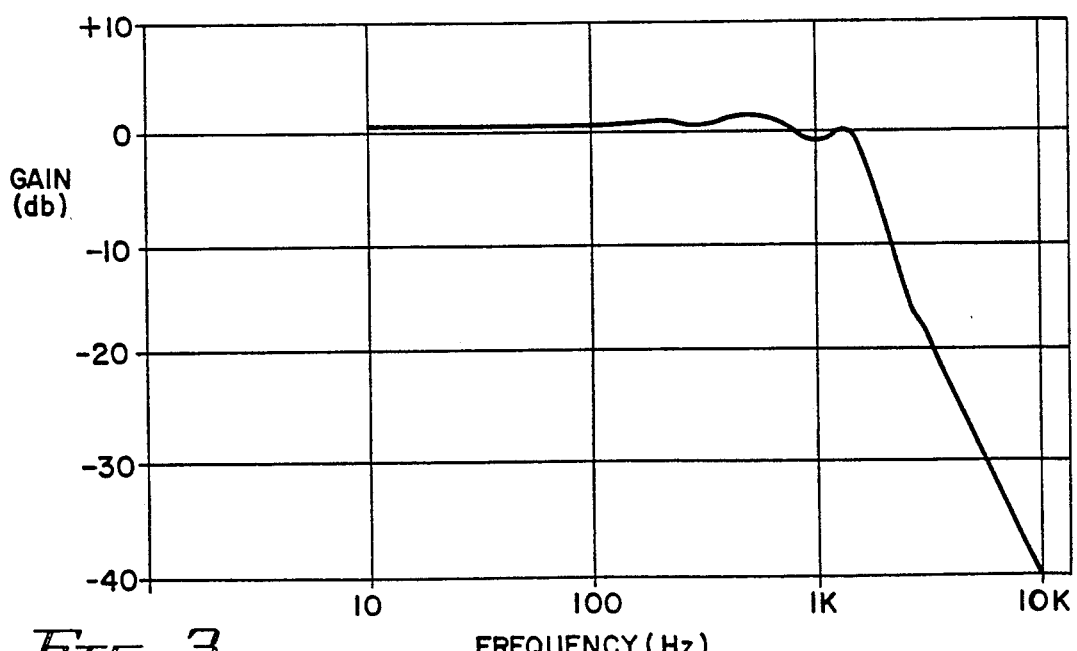
FIG. 3 shows the frequency response of the EMI filter and damper shown in FIG. 1.

The frequency response of the EMI filter 2 with the active damper is shown in FIG. 3. The resistance and capacitance of the first resistor R1 and the first capacitor C1 are 100K ohms and 0.01 microfarads. The overshoot of the filter 2 is reduced to 1.36 dB, which is 116% of the voltage on the DC link 6a.

The active damper can be adapted to any filter and power supply by changing several components. At higher power levels, the power rating of the FETS Q1 and Q2 and the fourth resistor R4 must be increased in order to dissipate the additional energy. Also, the time constant provided by the first capacitor C1 and first resistor R1 must be adjusted according to the values of filter inductor L and filter capacitor C in order to minimize power dissipation.

Thus disclosed is a damper which replaces a large, expensive capacitor. The active damper is equivalent to a passive damper with a series resistance R4 and a capacitance (C5)(R5)/R12 farads. The active damper has lower volume, weight and cost than a passive damper. These advantages increase with the power rating of the system. Further, the topology of the active damper is independent of EMI filter component values.

It will be understood that this embodiment is merely exemplary and that a person skilled in the art may make many variations and modifications without departing from the spirit and scope of the invention. All such modifications are intended to be included within the scope of the invention as defined in the appended claims.

I claim:

1. A damper for an L-C filter having at least one inductor and at least one capacitor coupled between a power supply and a DC link, said damper comprising:
   determining means for determining a steady-state voltage on said DC link said determining means includes a capacitor means in series with a resistor means coupled to said DC link wherein said L-C filter has a time constant, and wherein said capacitor means and said resistor means have a time constant which is approximately five times the time constant of the L-C filter;
   comparing means, responsive to said determining means, for comparing said steady-state voltage to an instantaneous voltage on said DC link; and
   dissipating means, responsive to said comparing means, for dissipating energy on said DC link when said instantaneous voltage on said DC link does not equal said steady-stage voltage.

2. The damper according to claim 1, wherein said determining means includes low-pass filter means, responsive to said DC link, for passing the steady state voltage; and storing means, responsive to said low pass filter means, for storing said steady state voltage, an output of said storing means being provided to said comparing means.

3. The damper according to claim 1, wherein said comparing means includes comparator means having one input supplied with said instantaneous voltage on said DC link and another input supplied with said steady-state voltage, an output of said comparator means providing an error signal when said instantaneous and steady state voltages are not equal.

4. The damper according to claim 3, wherein said DC link includes a DC link high and a DC link return, and wherein said dissipating means includes first load means, responsive to said error signal, for dissipating energy on said DC link high when said instantaneous voltage is greater than said steady state voltage.

5. The damper according to claim 4, wherein said first load means includes first transistor means having its controlled current path coupled between said DC link high and said DC link return and its current control supplied with said error signal.

6. The damper according to claim 4, wherein said dissipating means further includes second load means, responsive to said error signal, for dissipating energy stored in the inductor when said instantaneous voltage is lower than said steady state voltage.

7. The damper according to claim 6, wherein said first load means includes a first FET having its controlled current path coupled between said DC link high and DC link return and its gate supplied with said error signal; and wherein said second load means includes a second FET having its controlled current path coupled across said inductance means and its gate supplied with said error signal.

8. The damper according to claim 7, further including means for providing a floating power supply to said gates of said first and second FETS.

9. A damper for an LC filter having at least one inductor and at least one capacitor coupled between a power supply and a DC link, said damper comprising:
   determining means for determining a stead-state voltage on said DC link, said determining means including capacitor means in series with resistor means coupled to dais DC link wherein said LC filter has a time constant, and wherein said capacitor means and said resistor means have a time constant which is approximately five times the time constant of the L-C filter A comparator means having one input supplied with said instantaneous voltage on said DC link and another input supplied with said stead-state voltage from said capacitor means, an output of said comparator means providing an error signal when said instantaneous and stead state voltages are not equal; and dissipating means, responsive to said comparator means, for dissipating energy on said DC link when said instantaneous voltage on said DC link does not equal said steady state voltage.

10. The damper according to claim 9, wherein said DC link includes a DC link high and a DC link return, and wherein said dissipating means includes first load means, responsive to said error signal, for dissipating energy on said DC link high when said instantaneous voltage is greater than said steady stage voltage.

11. The damper according to claim 10, wherein said first load means includes first transistor means having its controlled current path coupled between said DC link high and said DC link return and its current control supplied with said error signal.

12. The damper according to claim 10, wherein said dissipating means further includes second load means, responsive to said error signal, for dissipating energy stored in the inductor when said instantaneous voltage is lower than said steady state voltage.

13. The damper according to claim 12, wherein said first load means includes a first FET having its controlled current path coupled between said DC link high and DC link return and its gate supplied with said error signal; and wherein said second load means includes a second FET having its controlled current path coupled across said inductance means and its gate supplied with said error signal.

14. The damper according to claim 13, further including means for providing a floating power supply to said gates of said first and second FETS.

* * * * *